US011763707B2

(12) United States Patent
Shibuya et al.

(10) Patent No.: US 11,763,707 B2
(45) Date of Patent: Sep. 19, 2023

(54) PROJECTING APPARATUS, LIGHT EMISSION CONTROL METHOD, AND NON-VOLATILE STORAGE MEDIUM STORING PROGRAM

(71) Applicant: CASIO COMPUTER CO., LTD., Tokyo (JP)

(72) Inventors: Takashi Shibuya, Tama (JP); Hiromichi Hamada, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/482,160

(22) Filed: Sep. 22, 2021

(65) Prior Publication Data

US 2022/0093019 A1    Mar. 24, 2022

(30) Foreign Application Priority Data

Sep. 24, 2020  (JP) ................................ 2020-159245

(51) Int. Cl.
*G09G 3/00* (2006.01)

(52) U.S. Cl.
CPC ......... *G09G 3/001* (2013.01); *G09G 2354/00* (2013.01); *G09G 2360/145* (2013.01)

(58) Field of Classification Search
CPC .... G09G 3/001; G09G 3/002; G09G 2354/00; G09G 2360/145
See application file for complete search history.

(56) References Cited

U.S. PATENT DOCUMENTS

| 2007/0282564 | A1* | 12/2007 | Sprague | ................. G03B 21/14 702/141 |
| 2008/0239246 | A1* | 10/2008 | Yamamoto | ............. G03B 21/53 353/69 |
| 2009/0244490 | A1* | 10/2009 | Nakamura | ......... G03B 21/2053 353/121 |
| 2011/0304833 | A1  | 12/2011 | Osaka et al. | |

(Continued)

FOREIGN PATENT DOCUMENTS

| CN | 101546100 A   | 9/2009 |
| JP | 2006-154671 A | 6/2006 |
| JP | 2007-025054 A | 2/2007 |

(Continued)

OTHER PUBLICATIONS

JPO; Application No. 2020-159245; Notice of Reasons for Refusal dated Jan. 4, 2023.

(Continued)

*Primary Examiner* — Amare Mengistu
*Assistant Examiner* — Gloryvid Figueroa-Gibson
(74) *Attorney, Agent, or Firm* — Fitch, Even, Tabin & Flannery LLP (57) ABSTRACT

Provided is a projecting apparatus including a projector that emits projection light, a processor that controls an operation of the projector, and a user operation receiver that receives an input operation. In receipt of the input operation concerning startup of the projecting apparatus, the processor assesses a state of the projecting apparatus and determines whether a lighting action of the projection light from the projector is valid based on an assessment result of the state of the projecting apparatus.

14 Claims, 7 Drawing Sheets

(56) References Cited

U.S. PATENT DOCUMENTS

2017/0272716 A1* 9/2017 Nakagawa ........... H04N 9/3185
2019/0227420 A1* 7/2019 Kuratomi ........... G03B 21/2053

FOREIGN PATENT DOCUMENTS

| JP | 2009-237197 A | 10/2009 |
| JP | 2010-224509 A | 10/2010 |
| JP | 2010-226699 A | 10/2010 |
| JP | 2012-118257 A | 6/2012 |
| JP | 2013-134283 A | 7/2013 |
| JP | 2016-040566 A | 3/2016 |

OTHER PUBLICATIONS

CNIPA; Application No. 202111114499.5; Reason for Refusal dated Apr. 4, 2023.

* cited by examiner

PROJECTING APPARATUS, LIGHT EMISSION CONTROL METHOD, AND NON-VOLATILE STORAGE MEDIUM STORING PROGRAM

CROSS-REFERENCE TO RELATED APPLICATIONS

This application is based upon and claims the benefit of priority under 35 USC 119 of Japanese Patent Application No. 2020-159245 filed on Sep. 24, 2020, the entire disclosure of which, including the description, claims, drawings, and abstract, is incorporated herein by reference in its entirety.

BACKGROUND OF THE INVENTION

1. Field of the Invention

The present disclosure relates to a projecting apparatus, a light emission control method, and a non-volatile storage medium storing a program.

2. Description of the Related Art

Projecting apparatuses (image projectors) display images by projecting it onto a projection screen such as a screen, wall, and desk. Projecting apparatuses have reduced the size and weight and increased the brightness capacity, and now can be carried around to be used in various places. JP 2012-118257 A discloses a projecting apparatus that can be carried around in a bag and that projects an image on an installation plane such as a desk.

BRIEF SUMMARY OF THE INVENTION

According to one aspect of the present invention, a projecting apparatus includes:
a projector that emits projection light;
a processor that controls an operation of the projector; and
a user operation receiver that receives an input operation,
wherein in receipt of the input operation concerning startup of the projecting apparatus, the processor assesses a state of the projecting apparatus and determines whether a lighting action of the projection light from the projector is valid based on an assessment result of the state of the projecting apparatus.

According to another aspect of the present invention, a light emission control method for a projecting apparatus including a projector that emits projection light, a processor that controls an operation of the projector, and a user operation receiver that receives an input operation includes:
assessing, in receipt of the input operation concerning startup of the projecting apparatus, a state of the projecting apparatus; and
determining whether a lighting action of the projection light from the projector is valid based on an assessment result of the state of the projecting apparatus.

According to another aspect of the present invention, a non-transitory computer-readable storage medium has a program stored thereon for controlling a computer used in a projecting apparatus including a projector that emits projection light, a processor that controls an operation of the projector, and a user operation receiver that receives an input operation, the program causing the computer to perform:
assessing, in receipt of the input operation concerning startup of the projecting apparatus, a state of the projecting apparatus; and
determining whether a lighting action of the projection light from the projector is valid based on an assessment result of the state of the projecting apparatus.

DETAILED DESCRIPTION OF THE INVENTION

Hereinafter, one or more embodiments are described with reference to the drawings.

First Embodiment

A projecting apparatus 1 in the first embodiment is described. The projecting apparatus 1 in this embodiment can be carried around, and can perform projection using a battery 21 without external commercial power supply.

Figure 1:
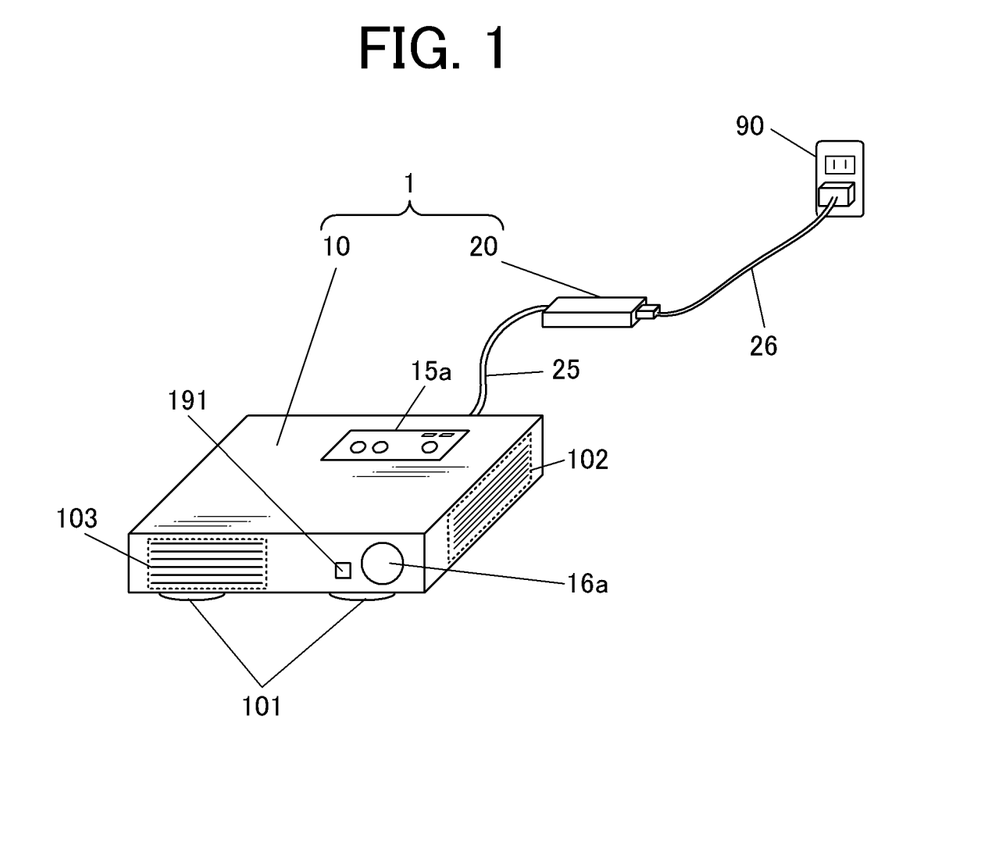
FIG. 1 is a perspective view showing a schematic external appearance of a projecting apparatus.

FIG. 1 is a perspective view showing a schematic external appearance of the projecting apparatus 1 in this embodiment.

The projecting apparatus 1 includes a main body 10 and a power supply unit 20 (power supply circuit). The main body 10 that performs projection includes a case of a shape substantially cuboid, for example. The corners of the case may be dropped or rounded, or the surfaces of the case may be uneven. Alternatively, the case of the main body 10 may be of a shape not cuboid, and may be of a shape of an elliptic cylinder with a curved surface. An emission hole 16a for projection light is arranged on a surface (front surface) of the projecting apparatus 1. An illuminance sensor 191 is arranged on the front surface (at least facing the emission direction of projection light in the case 10 of a shape not simply rectangular).

Multiple, or three legs, for example, (two are shown in the drawings) which can be fixed by changing the lengths are arranged on one of the surfaces adjacent to the front surface (bottom surface/lower surface). As the length of each of the legs 101 is adjusted, the emission direction of projection light, namely the image projection direction can be determined. The projecting apparatus 1 is not necessarily installed using the bottom surface as the installation face (the face supporting the projecting apparatus 1 in contact with a desk or table via the legs), and may be rotated 90 degrees to be vertically placed. The projecting apparatus 1 may include legs on a surface other than the bottom surface so that the projection direction can be adjusted if the projecting apparatus 1 is vertically placed, or may include attachment members on other surfaces that allow the legs detached from the bottom surface to be attached to the other surfaces. An operation panel 15a including a push-button switch and a light emitting diode (LED) lamp is arranged on a surface opposite to the bottom surface (upper surface).

An air inlet 102 is arranged on each of the four surfaces vertical to the bottom surface (including the front surface), and an air outlet 103 is arranged on the front surface. An input terminal 141 of a cable connected with an external device(s), a connection terminal of a power supply cable 25 connected to the power supply unit 20, and the like are arranged on the back surface facing the front surface. The power supply cable 25 can be detached from the connection terminal while the main body 10 is not in operation.

The power supply unit 20 supplies power to the main body 10. The power supply unit 20 supplies power input from a battery 21 (refer to FIG. 2) or an AC (alternating current) power source (external power source, mainly commercial one) at a certain DC voltage, to the main body 10. A power supply terminal 90 (outlet) of the external power source (for example, a commercial power supply at a DC voltage of 100 V) and the power supply unit 20 are connected by the cable 26. The cable 26 may be attachable and detachable to and from the power supply unit 20.

Figure 2:
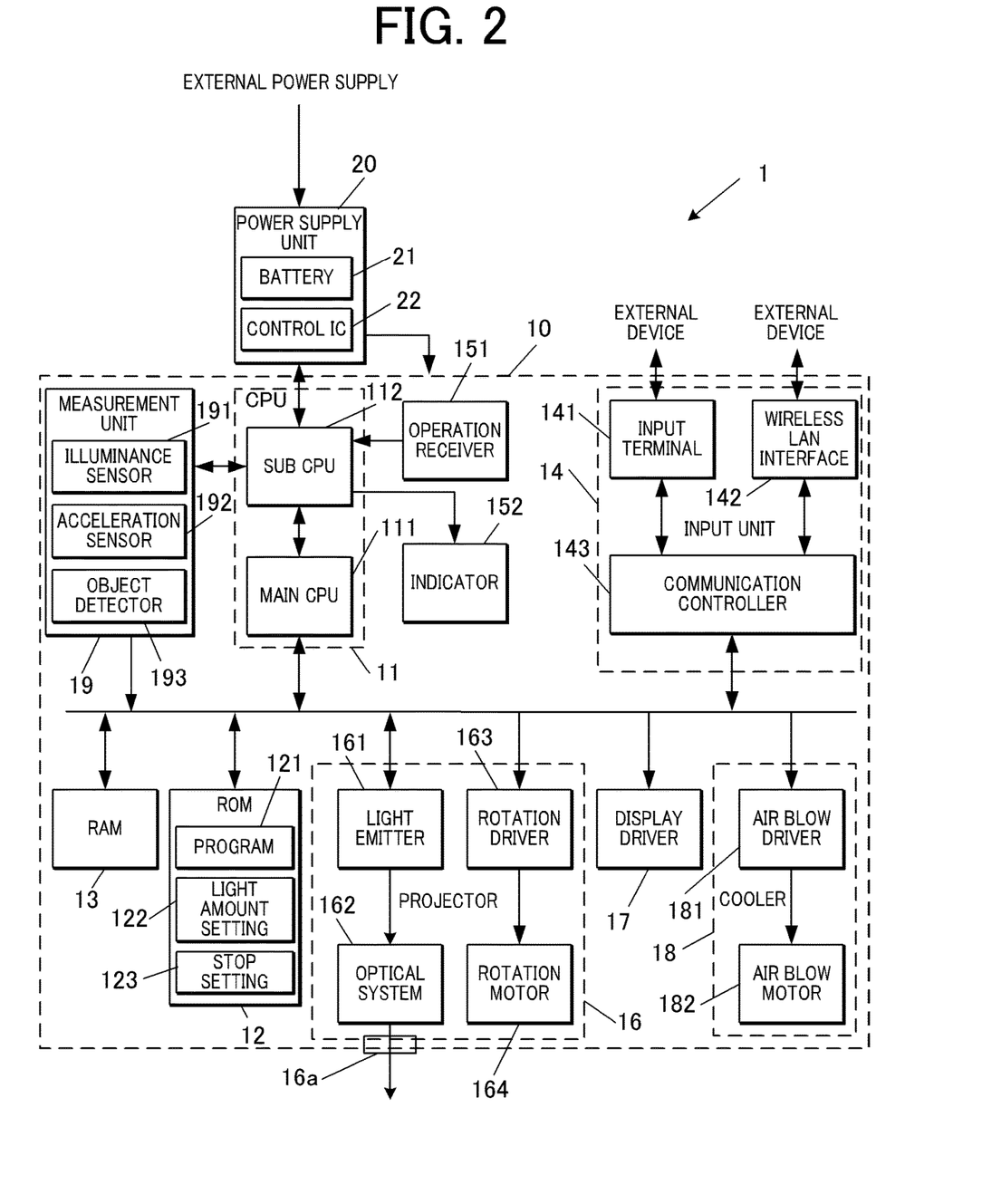
FIG. 2 is a block diagram of a functional configuration of the projecting apparatus 1 of the first embodiment.

FIG. 2 is a block diagram of a functional configuration of the projecting apparatus 1.

The projecting apparatus includes the battery 21 and the power supply unit 20 that supplies power to the main body 10 input from the battery 21 or an external AC power source. The power supply unit 20 includes a conversion circuit that rectifies AC power from the external power source to convert it into appropriate DC power. The battery 21 is a secondary battery that is chargeable with power from the external power source, and may be a lithium ion battery, but the present invention is not limited to this example.

The power supply unit 20 includes a control IC 22. The control IC 22 determines which of the external power source and the battery 21 (selectively) supplies power to the main body 10 according to whether power is input from the external power source, the voltage of the battery 21 (storage amount), or the like, and switches the battery 21 between charge and discharge. The control IC 22 detects an output voltage and outputs detection results at any time or at an appropriate frequency to the main body 10 (CPU 11).

The main body 10 includes a central processing unit (CPU) 11 (controller) (processor), a read only memory (ROM) 12, a random access memory (RAM) 13 (a computer configured by the CPU 11 and the RAM 13), an input unit 14, a user operation receiver 151, an indicator 152, a projector 16, a display driver 17, a cooler 18, and a measurer 19. The CPU 11 is connected to the components via a bus.

The CPU 11 is a hardware processor that centrally control the actions of the main body 10. The CPU 11 includes, for example, a main CPU 111 and a sub CPU 112. The CPU 11 may include multiple units that operate independently or in series depending on the functions. The main CPU 111 may switch the actions between on and off according to the on/off operation received via the user operation receiver 151, and the sub CPU 112 may be in operation continuously or intermittently as long as power is supplied from the power supply unit 20 to maintain the stand-by state even when the main CPU 111 is turned off, but the present invention is not limited to this example. The CPU 11 controls the actions of the projector 16 and determines the validity of emission of projection light based on the state of the apparatus according to the measurement of the measurer 19, as described later.

The ROM 12 is a non-volatile memory such as a mask ROM and a flash memory, and stores a program(s) 121, various kinds of setting data, and the like. The programs 121 include a control program for outputting projection of an image according to image data externally acquired and a control program for light emission at a startup moment as described later. The setting data includes a light amount setting 122 and a stop setting 123.

The RAM 13 provides the CPU 11 with a work memory space, and stores temporary data.

The light amount setting 122 stored in the ROM 12 includes an action setting according to the intensity of light (light emission intensity) emitted by the light emitter 161 of the projector 16. An appropriate intensity of light projected by the projecting apparatus 1 depends on a brightness of a place where the projecting apparatus 1 is used, a distance to a surface onto which light is projected, or the like. In the projecting apparatus 1, the intensity of light is adjusted accordingly.

The stop setting 123 stores conditions for determining, in response to a command of the action start received by the user operation receiver 151, whether the command is proper based on the measurement results by the measurer 19 (the validity of the lighting action).

The input unit 14 receives input of image data of a display target image and acquires it, and performs processing such as expansion as necessary. The input unit 14 includes an input terminal 141, a wireless LAN interface 142, and a communication controller 143.

A cable is connected between the input terminal 141 and an external device(s). The input terminal may be, for example, terminals concerning analog RGB signals, USB (Universal Serial Bus) terminals, HDMI (High Definition Multimedia Interface; (Registered Trademark)) terminals, or the like, and multiple terminals can be used selectively among those.

The wireless LAN interface 142 receives radio waves from an external device(s) via an antenna not shown in the drawings to demodulate and decrypt the radio waves, in conformity with a standard of a wireless LAN (IEEE802.11, or the like). The wireless LAN interface 142, which includes a network card, is connected with an external device(s) for communication based on the identification information via the wireless LAN.

The communication controller 143 controls image data acquisition via the input terminal 141 and/or the wireless LAN interface 142 to perform data expansion processing as necessary. When the acquired image data is movie data, the communication controller 143 may extend the data for image display drive. The communication controller 143 may include a dedicated processor for the image data processing described above. This processor may be a dedicated CPU or a logic circuit separate from the CPU 11 that centrally performs the processing.

The user operation receiver 151 receives external input operations from a user or the like via the push-button switch or the like on the operation panel 15a described above and outputs them as input signals to the sub CPU 112. The operation panel 15a may include multiple push-button switches for turning on and off the power supply and for various settings. The user operation receiver 151 may include a remote controller separately. In that case, the user operation receiver 151 may include a receiving unit that receives signals (IR signals or the like) from the remote controller.

Though not particularly limited, a protective member is not included in this embodiment, because, if a protective member such as a slide cover for prevention of erroneous operations is provided on the push-button switch, it leads to decrease in the operability. On contrary, the operations except for startup and shutdown may require a series of two or more input operations for requesting a setting menu and actual setting. The operations that can be received by a single input such as startup and shutdown may require a continuous operation (long press) of a predetermined time or longer.

The indicator 152, which includes an indicator with an LED lamp, notifies various states of power supply, insufficient charge of the battery 21, input of data, light amount setting, and the like according to the command of the CPU 11. The LED lamp may be lit or flashed in colors, or the brightness may be variable. The indicator only needs to be visible when directly looked at by the user just to check the lighting state, and has a remarkably low intensity of light compared to the LED of the light emitter 161.

The projector 16 generates light in each of RGB colors, and emits projection light from the emission hole 16a at pixel positions and at timings according to image data of the display target image. The projector 16 includes a light emitter 161, an optical system 162, a rotation driver 163, and a rotation motor 164.

The light emitter 161, which includes a laser diode and an LED (light emitting diode), for example, emits light at a specific wavelength. Here, for example, the light emitter 161 includes a red LED and a blue laser LED, which emit red light and blue light. The light emission intensity of the light emitter 161 is changeable in a setting range of the projecting apparatus 1.

The optical system 162 reflects and focuses generated light in each color to lead the light to the emission hole 16a. The optical system 162 includes part or all of an optical lens, a prism, a mirror, and a filter. At least part of the components are movable in the direction of the optical axis for adjustment of the focus point. The optical system 162 may include a movable mirror concerning digital light processing (DLP) such as a digital (micro) mirror device (DMD), which are arranged two-dimensionally in relation to the display pixels.

The rotation driver 163 causes the rotation motor 164 to rotate at a predetermined rotation speed.

The rotation motor 164 rotates a fluorescent plate not shown in the drawings. The fluorescent plate receives blue light to emit green light, that is, light in a wavelength band of each of three colors of RGB can be emitted by the light emitter 161 of blue and red and the fluorescent plate described above.

The display driver 17 performs an operation of adjustment of the emission position (direction) from the emission hole 16a and timings according to the image data to be projected. The display driver 17 operates the movable mirror described above to change the reflection angles between while light in each wavelength to the pixel position (direction) is emitted and while not, and thereby emits light in a predetermined wavelength from the emission hole 16a at only the emission timings.

The cooler 18 discharges heat of each component associated with light emission of the light emitter 161. The cooler 18 includes an air blowing driver 181 and an air blowing motor 182. The air blowing motor 182 rotates a fan that discharges heat from the inside of the case of the projecting apparatus 1. The air blowing driver 181 drives the air blowing motor 182 to rotate at a predetermined rotation speed. The operation of the air blowing motor 182 (fan) starts with the start of light emission of the light emitter 161, for example, and may continue for a while after the stop of light emission of the light emitter 161.

The measurer 19 measures the state of the apparatus in the environment and outputs it to the sub CPU 112. The measurer 19 includes an acceleration sensor 192 and an object detector 193 in addition to the illuminance sensor 191 described above. The illuminance sensor 191 measures the illuminance of the outside of the main body 10a. Though not particularly limited, the illuminance sensor 191 is arranged on the same surface as the emission hole 16a (front surface) as shown in FIG. 1, and measures the illuminance (brightness) in the direction of image projection. In that case, when the projection unit 16 emits projection light, the surface onto which the projection light is emitted also affects measurement of the illuminance.

The acceleration sensor 192 measures the acceleration (motion state) in the three axes of the apparatus including the gravitational acceleration. As the direction of the gravitational acceleration is specified, the positioning angle of the projecting apparatus 1a, especially the installation face is specified. The comparative motion state of the apparatus in the environment is deduced from the variation pattern of the acceleration.

The object detector 193 detects whether there is an object (including the installation plane and the wall, usually a solid, but may be a liquid) surrounding the main body 10a with respect to a direction(s) including at least the front face (for example, all the six faces). The object detector 193 may be, for example, an IR sensor, a magnetic sensor, or an electric sensor. The distance of the surrounding range depends on a specific configuration of the object detector, but a range defined as vicinity. With respect to the front face, for example, the distance is preferably smaller than a distance at which projection is possible by the projector 16 (focusable). With respect to other faces, an object is to be detected in contact or at a distance nearly in contact. For example, the range may be several mm to several tens of mm at maximum.

The measurer 19 may continuously perform measurement irrelevant to the operation state of the main CPU 111 as long as power is supplied from the power supply unit 20 (the CPU 112 is in an operable state or in operation).

Next, the actions of the projecting apparatus 1 in this embodiment at the time of startup are described.

In the projecting apparatus 1 in this embodiment, in receipt of a command to startup the main CPU 111 (start the operation of the apparatus) while power is supplied from the battery 21, the state of the apparatus is assessed, and whether the startup command is proper (validity of the lighting action) is determined based on the state assessment result. If it is determined that the startup command is improper (the lighting action is not valid), the lighting action by the light emitter 161 (projection light emission from the projector 16) 161 is stopped. The lighting action here means the action of causing the projector 16 (the light emitter 161) to keep lighting, and includes, therefore, both transition from the off state to the on state and maintenance of the on state.

The push-button switch of the operation panel 15a is in some cases pushed unintentionally by contacting other objects when the apparatus is carried around, for example. When the power supply unit 20 is connected to the main body 10 in such a situation, power is supplied from the battery 21, and generated and continued is unnecessary power consumption, especially with the light emission by the light emitter 161, power consumption comparatively larger than other components. Such power consumption results in wear of the battery 21, and problems may be thereby caused. For example, the battery 21 may be short of the residual charge when it is truly necessary to use the apparatus. Thus, such a situation is not proper for lighting, and the lighting action is not valid.

The apparatus state assessment is based on the measurement results of the measurer 19. Whether the startup command is proper or not is determined based on the state assessment result. It is determined by whether the assessed state satisfies required condition set in the stop setting 123. The gravitational acceleration among the accelerations in the three axes measured by the acceleration sensor 192 indicates the positioning angle of the projecting apparatus 1, and in the mobile projecting apparatus 1, the gravity direction usually indicates the direction of the installation plane of the apparatus. The accelerations excluding the gravitational acceleration from the measurement results indicates the states of movement and motion of the main body 10. When the projecting apparatus 1 is being carried around or installed, the variation patterns of the accelerations according to the operations are acquired, and the emission opening 16a is not static in the expected projection direction. In a case where such variation patterns and acceleration directions as described above are acquired, it is determined that the projecting apparatus 1 is not in the static state at a positioning angle suitable for projection, that is, the startup command is not proper (the lighting action is not valid).

Here, in order to acquire the variation patterns of the accelerations, it is necessary to acquire the measurement results in a time (for example, one to two seconds) according to the cycle of the variation patterns. For the above-described assessment to be quick, the sub CPU 112 does not start acquisition of values of the acceleration sensor 192 after the startup command is input to the sub CPU 112, but continuously acquires and retains the variation patterns of the accelerations in the last few seconds. Alternatively, the acceleration sensor 192 may maintain data in the last few seconds and the acceleration sensor 192 may collectively output the retained data in the few seconds according to the request from the sub CPU 112. In a case where the sub CPU 112 determines that the startup command is proper, the main CPU 111 starts up, and the light emission action of the light emitter 161 starts according to the startup sequence executed by the main CPU 111.

Alternatively, without measuring the variation patterns of the accelerations, the state assessment may be based on the maximum value of the absolute values of the accelerations simply measured up to the timing when the light emitter 161 starts the light emission.

Figure 3:
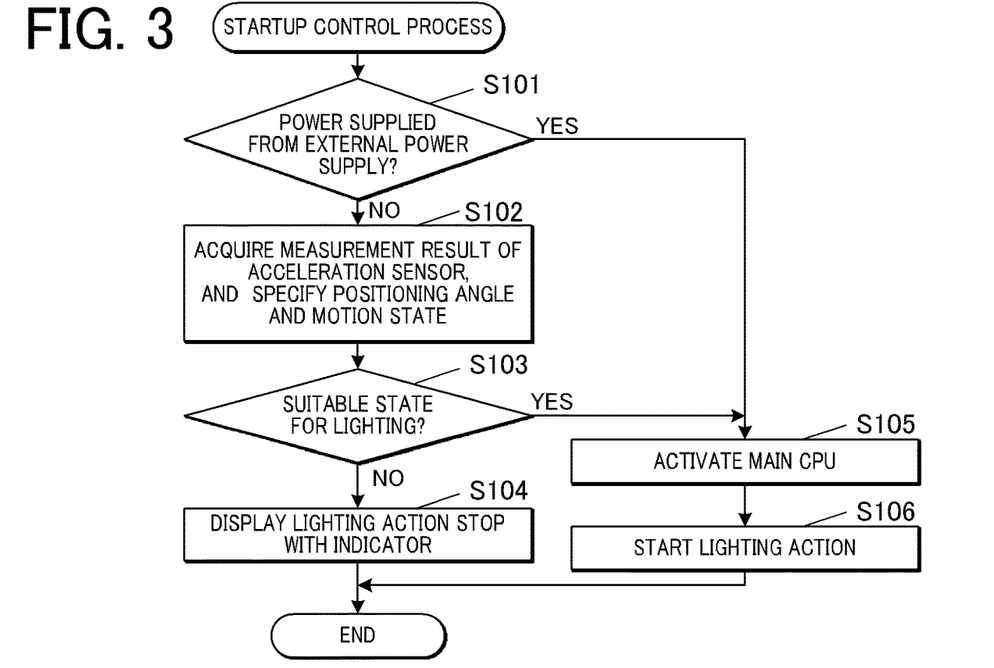
FIG. 3 is a flowchart showing control steps of a startup control process executed on the projecting apparatus.

FIG. 3 is a flowchart showing control steps of the startup control process executed by the CPU 11 in the projecting apparatus 1. The startup control process is started when the sub CPU 112 receives an input signal concerning startup from the user operation receiver 151.

When the startup control process is started, the CPU 112 determines whether the main body 10 receives power supply from an external power source (Step S101). In a case where it is determined that power is supplied from an external power source ("YES" at Step S101), the sub CPU 112 starts the main CPU 111 (Step S105). The started main CPU 111 executes the startup sequence and starts the lighting action by the light emitter 161 (Step S106). The CPU 11 then ends the startup control process. When the startup sequence by the main CPU 111 is automatically executed at the time of the startup of the main CPU 111, the startup control process itself may be ended when the sub CPU 112 starts the main CPU 111.

If it is determined that power is not supplied from an external power source (power is supplied from the battery 21) ("NO" at Step S101), the sub CPU 112 acquires the measurement results of the acceleration sensor 192 from the measurer 19. The sub CPU 112 specifies the positioning angle of the apparatus based on the measurement results and assesses the movement state (Step S102). The sub CPU 112 determines whether the apparatus is in a suitable state for properly causing the light emitter 161 to light and the lighting action is valid based on the assessment results (Step S103). If it is determined that the apparatus is in a suitable state (valid) ("YES" at Step S103), the sub CPU 112 proceeds to Step S105.

If it is determined that the apparatus is not in a suitable state (the lighting action is not valid) ("NO" at Step S103), the sub CPU 112 does not start the main CPU 111, that is, stops emission of the projection light from the projector 16, and causes the indicator 152 to indicate that the lighting action is stopped (determination that the lighting action is not valid) (notifying action). For example, a flashing action of the LED showing the power supply state is repeated a predetermined number of times (for example, twice or thrice) (Step S104). The CPU 11 (sub CPU 112) then ends the startup control process.

Next, a modification example of the actions at the time of startup is described.

In the description described above, the measured values of the acceleration sensor 192 of the measurer 19 are used to determine whether the state is suitable for the lighting action. However, in Modification Example 1, the state concerning the positional relations between the projecting apparatus 1 and the surrounding objects determined by the detection result of the object detector 193 may be used to determine whether the state is suitable for the lighting action (whether the lighting action is valid).

In a case where an object is positioned in the vicinity of the front face, especially at a smaller distance than the minimum focal length of the projection light (optical system 162), it is determined that the light emitter 161 is intentionally lit for projection. In a case where an object is detected near two or more of the six faces, the apparatus is considered to overlap with or contact other objects in a bag or a case, for example, and the situation is not suitable for projection.

Figure 4:
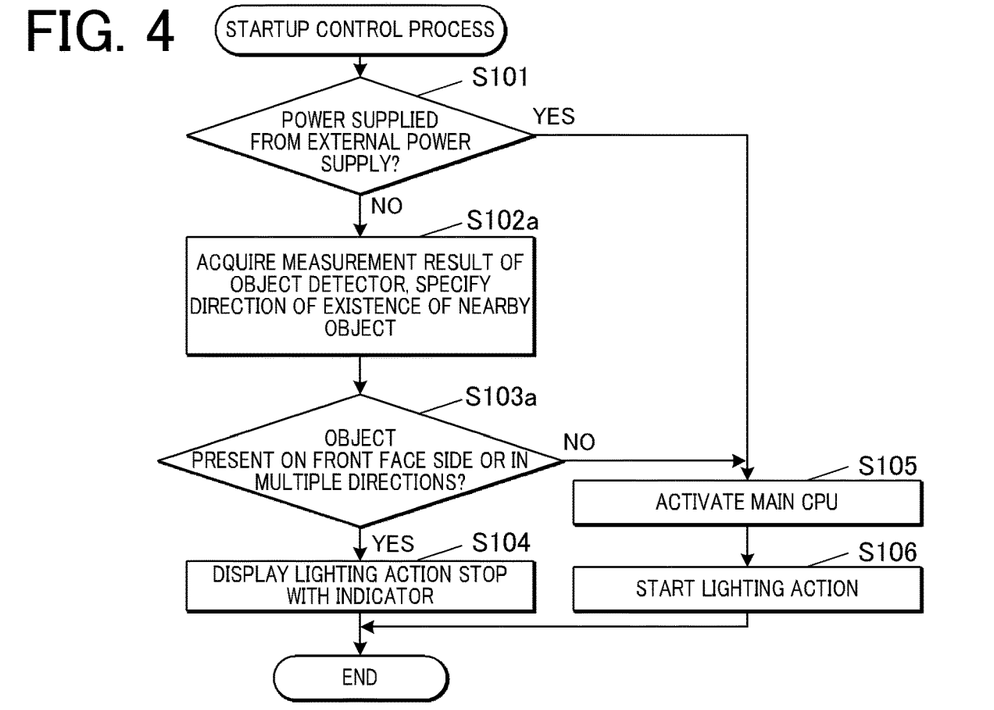
FIG. 4 is a flowchart showing control steps of a startup control process in Modification Example 1.

FIG. 4 is a flowchart showing control steps of the startup control process in Modification Example 1.

In the startup control process in this Modification Example 1, Steps S102 and S103 are substituted with Steps S102a and S103a. The process besides those steps is the same and denoted with the same reference numerals, and is not described in detail.

If the process is branched to "NO" at Step S101, the sub CPU 112 acquires the detection result of the object detector 193, and specifies in what direction an object is positioned in the vicinity (Step S102a). The sub CPU 112 determines whether or not there is an object near the front face (in the emission direction of projection light) or in other directions (Step S103a). One of the other directions is usually the installation face or the holding face in motion, therefore, the above-described determination condition is to determine whether there is an object near the faces other than the installation face. If it is determined that the above-described condition is satisfied ("YES" at Step S103a), the sub CPU 112 proceeds to Step S104. If it is determined that the above-described condition is not satisfied ("NO" at Step S103a), the sub CPU 112 proceeds to Step S105.

Alternatively, as Modification Example 2, the measurement results of the acceleration sensor 192 and the detection result of the object detector 193 may be used in combination.

Figure 5:
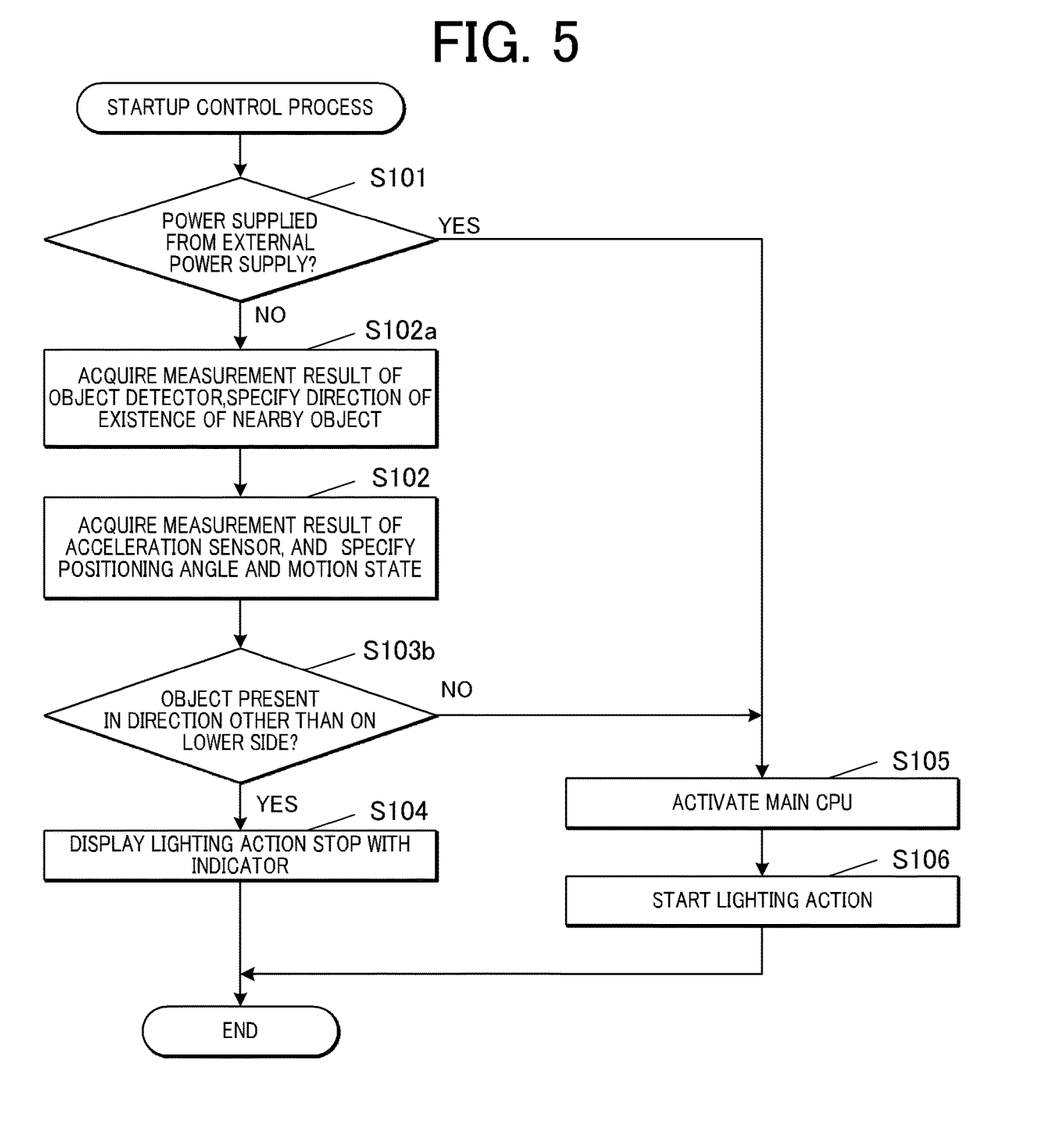
FIG. 5 is a flowchart showing control steps of a startup control process of Modification Example 2.

FIG. 5 is a flowchart showing control steps of the startup control process of Modification Example 2.

In the startup control process of Modification Example 2, Step S102 in the above-described embodiment and Step S102a in Modification Example 1 are both present, and Step S103 is substituted by Step S103b. The process besides this step is the same. The same steps are denoted with the same reference numerals, and are not described in detail.

When the results from the object detector 193 are acquired and analyzed at Step S102a and the results from the acceleration sensor 192 are acquired and analyzed at Step S102, the sub CPU 112 correlates the nearby objects and the gravity direction and determines whether there is an object in the directions besides the gravity direction (downward direction) (Step S103b). The downward direction is namely the direction toward the installation plane of the projecting apparatus 1. The sub CPU 112 determines whether there is an object near the faces that are not supposed to be positioned next to other objects. If it is determined that there is an object in the directions besides the downward direction ("YES" at Step S103b), the sub CPU 112 proceeds to the Step S104. If it is determined that there is no object in the directions besides the downward direction ("NO" at Step S103b), the sub CPU 112 proceeds to Step S105.

In practice, the projecting apparatus 1 may need to be installed by the wall for projection because of the availability of space. Therefore, the lighting action may be stopped if there is an object near three or more faces in Modification Example 1 or near two or more faces in Modification Example 2.

In addition to or instead of the results from the acceleration sensor 192 and the object detector 193, the measurement results of the illuminance sensor 191 may be used to determine whether the lighting action is valid as Modification Example 3. The illuminance sensor 191 is arranged on the same face (front face) as the emission hole 16a. Because of that, when emitted light irradiates the projection surface, its effects are more likely to have influence on the measured values. In that case, if there is an object quite near to the emission hole 16a, the illuminance measured by the illuminance sensor 191 may greatly increase as the light reflected on the object is measured by the illuminance sensor 191. There is some light in a hall or conference room where a presentation usually takes place. In a case where the illuminance is almost zero, it is assumed that the illuminance sensor 191 (namely the front face) is covered by an object or is in a closed light shield bag. Such states are not proper (not suitable) for projection. That is, it is determined that the lighting action is not valid.

Figure 6:
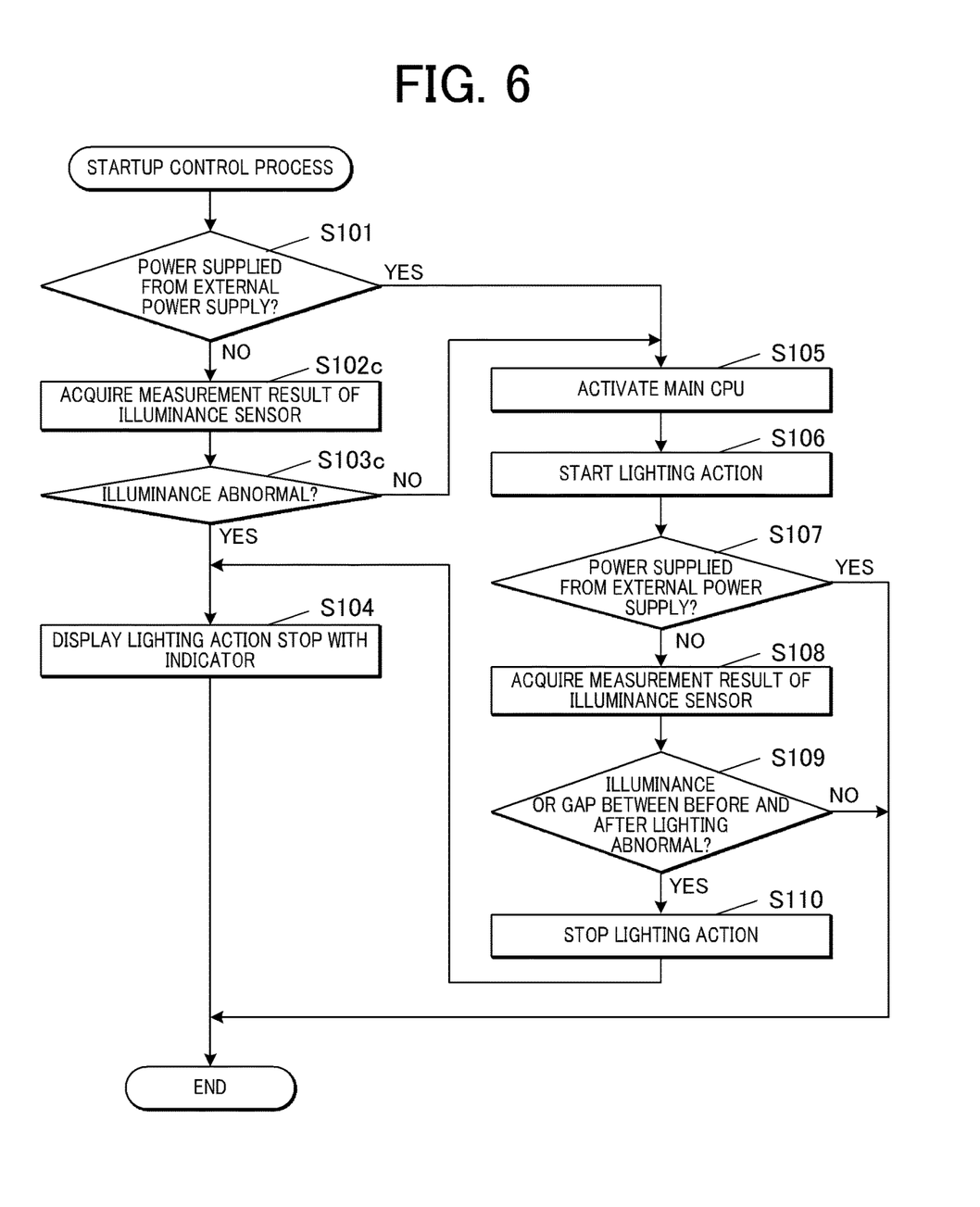
FIG. 6 is a flowchart showing control steps of a startup control process in Modification Example 3.

FIG. 6 is a flowchart showing control steps of the startup control process by the CPU in Modification Example 3.

In this startup control process, Steps S102 and S103 are respectively substituted with Steps S102c and S103c, and Steps S107 to S110 are added. The process besides those step is the same. The same steps are denoted with the same reference numerals, and are not described in detail.

If the process is branched to "NO" at Step S101, the sub CPU 112 acquires the measurement results from the illuminance sensor 191 (Step S102c). The sub CPU 112 determines whether the acquired illuminance is in an abnormal range, for example, higher than the upper limit or lower than the lower limit (Step S103c). If it is determined that the illuminance is in an abnormal range (does not meet the requirement) ("YES" at Step S103c), the sub CPU 112 proceeds to Step S104.

If it is determined that the illuminance is not in an abnormal range ("NO" at Step S103c), the sub CPU 112 proceeds to Step S105. After the process is switched to the main CPU 111 and the lighting action by the light emitter 161 is started at Step S106, the main CPU 111 again determines whether power is supplied from an external power source (Step S107). If it is determined that power is supplied from an external power source ("YES" at Step S107), the main CPU 111 ends the startup control process.

If it is determined that power is not supplied from an external power source (is supplied only from the battery 21) ("NO" at Step S107), the main CPU 111 acquires the measurement results from the illuminance sensor 191 (Step S108). The main CPU 111 determines whether the acquired illuminance is in an abnormal range or whether the gap between before the lighting action is started (when the light is not turned on. measurement results of the illuminance sensor 191 acquired at Step S102c) and after the projector 16 starts to emit projection light is in an abnormal range (the emission hole 16a is covered as described above or an object quite near the emission hole 16a reflects the emitted light, making the gap too large) (Step S109). If it is determined that none of them are in an abnormal range ("NO" at Step S109), the main CPU 111 ends the startup control process. If it is determined that at least one is in an abnormal range ("YES" at Step S109), the main CPU 111 stops the lighting action by the light emitter 161 (stops emission of the projection light) (Step S110). The main CPU 111 then proceeds to Step S104.

If the process is branched to "YES" at Step S107, the main CPU 111 may cause the sub CPU 112 to perform the actual process at Steps S108 and S109 and acquire only the determination results at Step S109. In a case where the main CPU 111 directly perform the process, the main CPU 111 may acquire the measurement results of the illuminance sensor 191 directly from the illuminance sensor 191 or via the sub CPU 112.

In the above-described process, at least Steps S102, S102a, S102c, and S108 constitute a state determination in the light emission control method and a state determination means in the program 121 in this embodiment. Steps S103, S103a to S103c, and S109 constitute a validity determination in the light emission control method and a validity determination method in the program 121 in this embodiment.

As described above, the projecting apparatus 1 in this embodiment includes the projector 16 that emits projection light, a CPU 11 that controls the operation of the projector 16, and the user operation receiver 151 that receives input operations. When receiving an input operation concerning the start of the operation of the apparatus, the CPU 11 assesses the state of the apparatus based on the measurement results of the measurer 19, and determines whether the lighting action concerning the projection light from the projector 16 is valid based on the assessment result.

In the projecting apparatus 1, regarding the part with unavoidable physical operations such as push operations, the apparatus state is assessed based on the measurement by the measurer 19 independent of such operations, and whether the lighting action is valid is determined based on the assessment result. It is thereby possible to detect unintended lighting actions at timings when the light is not supposed to be turned on such as when the apparatus is being moved. That validity determination makes it possible to control the state of light emission so as to stop or suppress the lighting actions at the time of startup not valid in the projecting apparatus 1. Thus, the projecting apparatus 1 can suppress unnecessary power consumption. It is therefore possible to suppress troubles such as shortage of the residual charge, due to which the apparatus cannot be used when it is truly necessary. It is also possible to prevent errors caused by heating of the bag or case for carrying by the emitted light while the projecting apparatus 1 is being carried around. It is less likely to cause troubles on the measurement system because the state is assessed based on measurement of the part irrelevant to mechanical operations such as a user input operation or form change (deformation). The projecting apparatus 1 can thus determine the validity stably and continuously. That is, a portable projecting apparatus configured as disclosed in JP 2012-118257 A may be operated unintentionally by contact of an external object with the switch when moved to be carried around to be brought out or brought in. The projecting apparatus wastes power when light is unintentionally turned on with such an operation. On contrary, if the lighting action requires many operations, the convenience for users is spared. However, according to the present disclosure, the light emission state at the start can be controlled without reducing the convenience for users.

If it is determined that the lighting action is not valid based on the assessment result, the CPU 11 decreases the light intensity on the projector 16 (the intensity of light emission by the light emitter 161). This makes it possible to effectively suppress power consumption by the lighting action that is unnecessary.

In particular, the CPU 11 stops emission of the projection light (light emission by the light emitter 161) from the projector 16 in a case where the intensity of the projection light is decreased. This makes it possible to decrease wasted power consumption by completely stopping the lighting action that is unnecessary.

The projecting apparatus 1 includes the battery 21, and further includes the power supply unit 20 that selectively supplies power from an external power source or the battery 21. The CPU 11 determines whether the lighting action is valid based on the above-described assessment when power is supplied from the battery 21.

It is usually hard to connect the apparatus to the external power source when the apparatus is being carried around, and it is likely that power is supplied from the battery 21. In a case where the light emitter 161 emits light by an unintended startup operation when the apparatus is being carried around, charge of the battery 21 is reduced, and it is more likely that the light is not turned on when it is truly necessary. On contrary, when the apparatus is in the static state, unintended startup operations are less likely, and an unintended operation is likely to be noticed by users. Therefore, the lighting action is not stopped when power is supplied from an external power source. This makes it possible to decrease the possibility that the light is not turned on due to an erroneous determination though the action is actually intended. Such a case has nothing to do with unnecessary power consumption on the battery 21. Thus, as whether the lighting action is valid is determined only when power is supplied from the battery 21, it is possible to decrease the possibility of shortage of power charge in the battery 21.

In the projecting apparatus 1, the measurer 19 includes the acceleration sensor 192. The CPU 11 assesses the state of the apparatus based on the motion state according to the measurement results of the acceleration sensor 192, and determines the lighting action is valid based on the state assessment result.

That is, it is possible to reliably assess that the apparatus is not in a state to be used as the movement of the apparatus is detected. The projecting apparatus 1 can stop unnecessary lighting actions according to those assessment result. The movement of the apparatus is detected only at the time of startup input. This can prevent the lighting action from being stopped unintentionally when the projecting apparatus 1 is moved or adjusted while the presentation is actually taking place.

In the projecting apparatus 1, the measurer 19 includes the object detector 193 that detects surrounding objects. The CPU 11 assesses the state concerning the positional relations between the apparatus and the surrounding objects based on the assessment results of the object detector 193. The projecting apparatus 1 is assumed to be carried around in a bag or a case (especially at a certain distance or longer). But the projecting apparatus 1 is used with the surrounding area besides the installation face being open for projection and air ventilation. Thus, it is possible to appropriately assess whether the user performs an input operation with intention for projection by detecting whether the surfaces of the apparatus are in contact with a bag or a case. Therefore, the projecting apparatus 1 can suppress unnecessary power consumption by processing of stopping the lighting action based on those assessment results. It is also possible to prevent errors due to rise of the temperature cause by heat from the lighting action when a bag or a case is in contact.

The CPU 11 determines that the lighting action is not valid when there is an object in the directions besides in the direction of the installation face of the apparatus specified based on the measurement results of the acceleration sensor 192. As multiple sensors are used in combination such as the acceleration sensor 192 and the object detector 193 as described above, it is possible to more reliably assess the state of the projecting apparatus 1, further making it possible to determine whether the lighting action is valid. The power consumption concerning the operation of the sensor(s) is sufficiently small in comparison to the lighting action and the operation of the CPU 11, and erroneous determinations are more reliably suppressed. It is thus possible to realize both efficient reduction of power consumption and suppression of unnecessary operations concerning erroneous determination.

The object detector 193 can detect objects in the direction of emission of the projection light. The CPU 11 determines that the lighting action is not valid when there is an object in the vicinity of the emission direction (surrounding area). In a case where an input operation for startup is performed with an intention of image projection, the projection light is directed so as to be projected in the projection surface. Thus, even if there is a little deviation, it is assumed that there is nothing interrupting projection. Thus, it is possible to determine whether an intended input operation is appropriately performed with an intention for projection by considering the direction of the front face at least, or determining whether there is an object independently from the other directions in some cases.

In the projecting apparatus 1, the measurer 19 includes the illuminance sensor 191. The CPU 11 assesses the state concerning the illuminance based on the measurement results of the illuminance sensor 191, and determines, if the state (illuminance) does not meet the requirement, that the lighting action is not valid. There is usually some light even in a hall or a conference room without windows, when the projecting apparatus 1 is used. On the other hand, when the projecting apparatus 1 is stored in a bag to be carried around, the inside can be quite dark, being sealed for waterproofing and dustproofing, because bags for such electronic devices are often thick with cushioning materials or the like. On contrary, in too bright an environment such as a corridor by a window not at all shielded, visible projection is possible if the light is turned on. It is unlikely that a startup operation is intentionally input also in that case. Thus, the state of being carried around may be assessed considering the light amount in such cases.

The illuminance sensor 191 is directed in the same direction as the emission direction of projection light. The darkness of the projection surface affects the validity of projection. Thus, as the illuminance in the projection direction is detected, it is possible to determine more accurately whether it is necessary to stop the lighting action.

The CPU 11 acquires the illuminance measurement results of the illuminance sensor 191 before start of the lighting action and after start of emission, and determines the validity of the lighting action based on the state concerning the intensity of the illuminance change. In a case where the measurement values from the illuminance sensor 191, the state of the surrounding area greatly varies depending on the environment of use. Thus, as the light amounts before and after lighting, not a result of one-time measurement, are considered in the determination, the state of the surrounding area can be assessed more accurately, and the validity of the lighting action can also be determined more accurately. The projecting apparatus 1 can stop the lighting actions more properly.

The projecting apparatus 1 includes the indicator 152 that performs notification. If it is determined that the lighting action is not valid (that is, the lighting action is stopped), the CPU 11 causes the indicator 152 to perform notification such as a blinking action of the LED according to the determination (to stop). In a case where the lighting action is stopped though the input operation is intended, the user can learn from the notification that it is not a failure but a result of normal operation. Thus, the user can deal with the situation by removing the obstacles or darkening the projection surface.

The light emission control method of the present disclosure on the projecting apparatus 1 includes a state assessment to assess the state of the apparatus in receipt of an input operation for startup of the operation of the apparatus, and a validity determination to determine whether the lighting action concerning the projection light from the projector 16 is valid based on the assessment result.

By this light emission control method of assessing the state of the apparatus independently from an input operation concerning physical operations such as pressing operations and determining whether the lighting action is valid based on the assessment result, it is possible to suppress unintended lighting at a timing when the light is not supposed to be turned on such as when the apparatus is being carried around. It is thereby possible to suppress occurrence of troubles in the projecting apparatus 1, such as where the apparatus cannot be used due to insufficient remaining power. It is also possible to prevent errors caused by heating of the bag or case for carrying by the emitted light while the projecting apparatus 1 is being carried around. It is less likely to cause troubles on the measurement system because the part irrelevant to mechanical operations such as a user input operation or form change (deformation) is measured. The projecting apparatus 1 can thus determine the validity stably and continuously.

The program 121 of this embodiment causes the computer of the projecting apparatus 1 (The CPU 11 and the RAM 13) to function as a state assessment means to assess the state of the apparatus based on the measurement results of the measurer 19 in receipt of an input operation for startup of the operation of the apparatus, and a validity determination means to determine whether the lighting action concerning the projection light from the projector 16 based on the assessment result. As the program 121 is executed by the CPU 11 as described above, it is possible to determine the validity of the lighting action easily and accurately. Thus, it is possible to control the lighting situation at the time of startup without requiring a complicated configuration and reduce power consumption, heating in particular, due to unnecessary lighting actions.

Second Embodiment

Next, a projecting apparatus 1a in the second embodiment is described.

Figure 7:
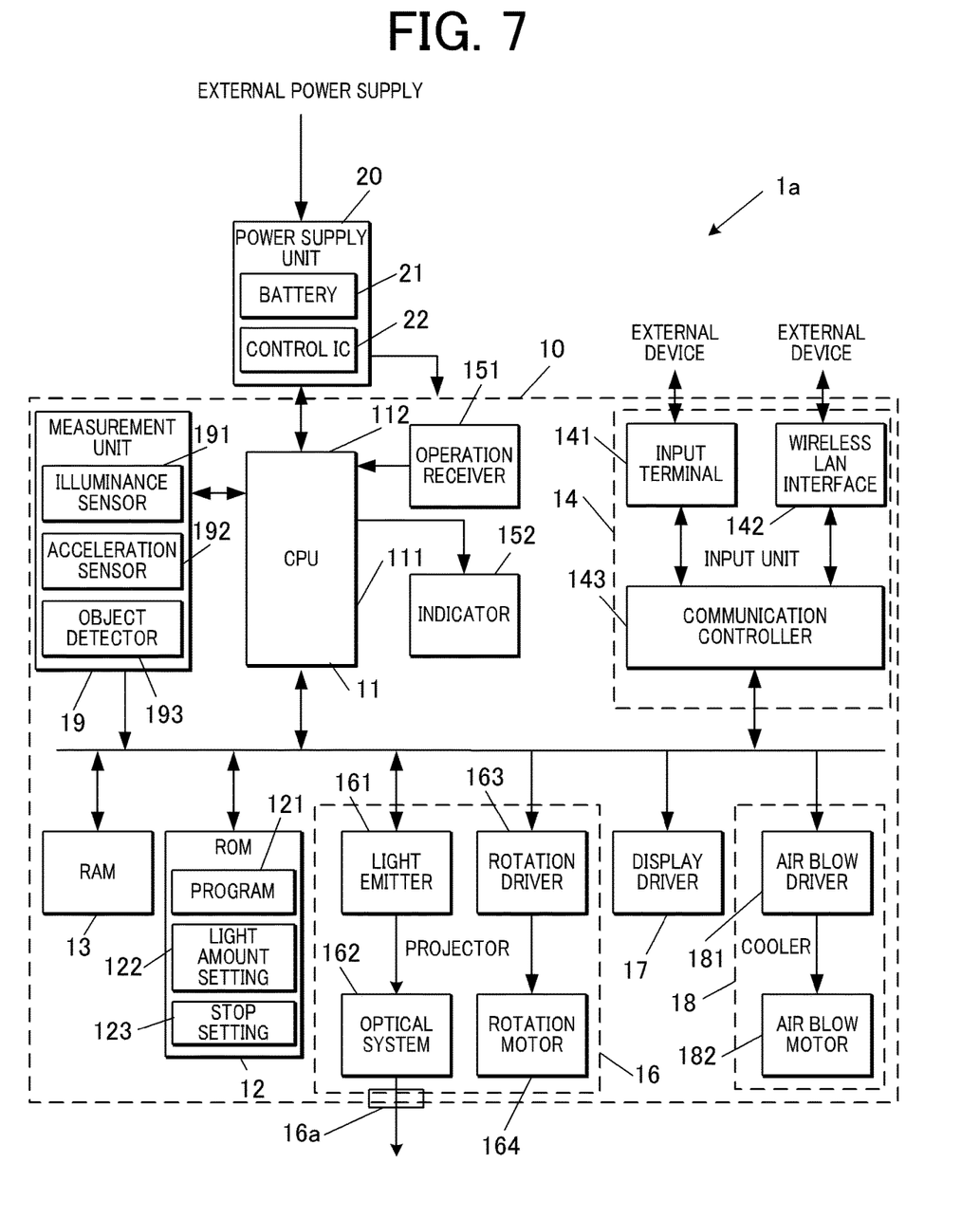
FIG. 7 is a block diagram showing a functional configuration of a projecting apparatus in the second embodiment.

FIG. 7 is a block diagram showing a functional configuration of the projecting apparatus 1a in the second embodiment.

In this projecting apparatus 1a, in comparison to the projecting apparatus 1 in the first embodiment, the CPU 11 is integrated in the main body 10a and receives signals from the user operation receiver 151, controls the operation of the indicator 152, and acquires the measurement results from the measurer 19. The CPU 11 and the measurer 19 stop the operation except during the period since the turning-on operation until the turning-off operation or until interruption of the power supply, and start the operation after the turning-on operation is received by the user operation receiver 151. The configuration besides this is the same. The same configuration is denoted with the same reference numerals, and is not described in detail.

Figure 8:
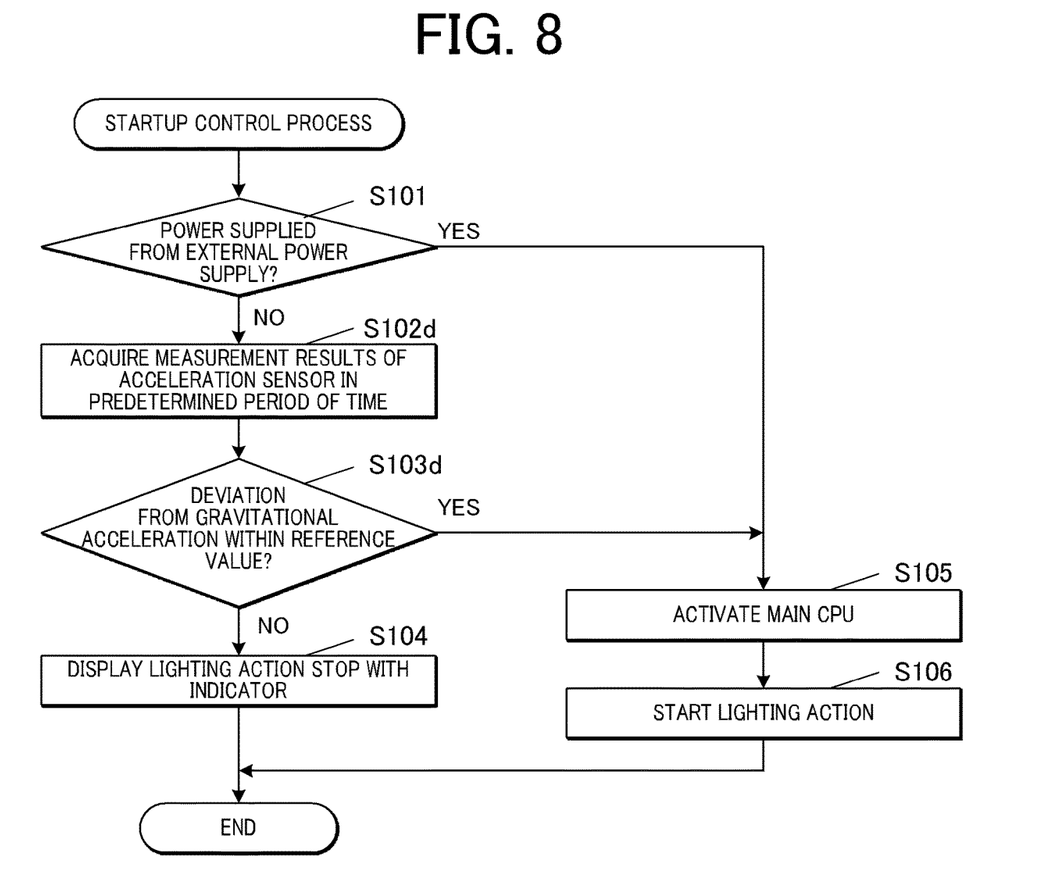
FIG. 8 is a flowchart showing control steps of a startup control process executed on the projecting apparatus in the second embodiment.

FIG. 8 is a flowchart showing control steps of the startup control process by the CPU 11 executed on the projecting apparatus 1a in this embodiment.

This startup control process is the same as the startup control process in the above-described embodiment except that Step S102 and S103 are respectively substituted by Step S102d and S103d, and the same steps are denoted with the same reference numerals, and are not described in detail.

If the process is branched to "NO" in the determination at Step S101, the CPU 11 starts the measurement action by the measurer 19, and acquires the measurement results in a predetermined period (3 to 5 seconds, for example) from the acceleration sensor 192 (Step S102d). The CPU 11 calculates how much the acceleration in a predetermined time deviates from the gravitational acceleration, and determines whether the change amount is within the reference value (Step S103d). The gravitational acceleration may be stored in the ROM 12 as a fixed value, or may be calculated based on the average value in a period where the acceleration change is not detected in the previous normal measurement. A value deviating from the gravitational acceleration the most among the measured values acquired at a sampling frequency is specified and a gap between the specified value and the gravitational acceleration is acquired as a change amount. If the gravitational acceleration direction can be specified within a predetermined period of time, the maximum value of the magnitude of the deviation vector from the gravitational acceleration vector may be specified, or if it is difficult to specify the direction, the absolute value may be simply used for comparison.

If it is determined that the change amount is within the reference value ("YES" at Step S103d), the CPU 11 proceeds to Step S105. If it is determined that the change amount is greater than the reference value ("NO" at Step S103d), the CPU 11 proceeds to Step S104.

As described hereinbefore, in the projecting apparatus 1a in this embodiment, whether the lighting action is valid is determined by operation of the measurer 19 after the startup operation is received via the user operation receiver 151. It is thereby possible to suppress unnecessary lighting operations while reducing the operation amount during the standby. The analysis processing concerning specification of the change patterns of the acceleration is not performed. Thus, the processing is reduced and shortened.

The present invention is not limited to the above-described embodiments, and can be variously modified.

For example, in the above-described embodiments, the single CPU 11 or the CPU 11 separated into the main CPU 111 and the sub CPU 112 is described. However, in a case where the operation of the CPU 11 is specifically limited, the hardware processor may not be a CPU but a microcomputer that performs processing corresponding to the specific operation.

The above-described embodiments include the illuminance sensor 191 that is arranged on the front side and that measures the illuminance, but the present invention is not limited to this example. For example, in the projecting apparatus 1 that includes an ambient sensor that changes the intensity of light emission in image projection in relation to the brightness of the surrounding area as the illuminance sensor, the illuminance sensor 191 may be arranged at a position suitable for light adjustment but not limited to the front face.

In the above-described embodiments, an example in which the illuminance sensor 191, the acceleration sensor 192, and the object detector 193 are each used and an example in which the acceleration sensor 192 and the object detector 193 are used in combination are described as the state assessment, but the present invention is not limited to these examples. Any combination of the sensors may be used to assess the state and determine the validity of the lighting action. The sensor is not limited to these three kinds, and a sensor or a state detection system that measures other physical quantities may be used.

In the above-described Modification Example 2, the installation face of the projecting apparatus 1 is specifically on the lower side. However, the projecting apparatus 1 may be flipped upside down and hung from the ceiling to be fixed, though it is not supposed to be usual as a portable projector. Thus, the installation face may not be specified and treated the same as the faces other than the front face. Alternatively, the user may set the installation face in a specific way.

Similarly, the process may be simplified by assessing whether the state is proper for lighting by the same requirement regarding the front face without differentiating it from the requirement for the other faces.

In a case where the illuminance sensor 191 is used to assess the suitable state of the lighting action in Modification Example 3, the abnormal range may be different from the above description. For example, one of the ranges of the illuminance higher than the upper limit or lower than the lower limit may be excluded from the abnormal range.

In the above-described embodiments, the lighting action may be stopped as not valid after the lighting action is once started in some cases using the illuminance sensor 191. However, the determination may be completed before the lighting action commonly to the other sensors, excluding such a step.

In the above-described embodiments, the measurer 19 includes all of the illuminance sensor 191, the acceleration sensor 192, and the object detector 193. However, the component not used in the determination concerning necessity to stop the lighting action may be excluded.

In the above-described embodiments, when the lighting action is stopped, the indicator 152 performs the blinking action of an LED indicator, but the notification is not limited to this example. Other actions may be performed, or the notification may be excluded.

In the above-described embodiments, if it is determined that the lighting action is not valid, the lighting action is simply stopped by the control operation, but the present invention is not limited to this example. For example, instead of completely stopping the lighting action, the intensity of light emission by the light emitter 161 (the intensity of projection from the projector 16) may be decreased by the control operation. The lighting with a decreased intensity of light can inform the user that the normal lighting action is not executed not because of a failure but according to the determination result. In a case where the positioning or the like is adjusted with some movement on the installation plane, projection with a light intensity lower than the usual makes efficient adjustment possible.

Even in a case where it is determined that the lighting action is not valid according to the assessment result acquired from the measurement of the measurer 19, when the light intensity setting is sufficiently low from the beginning and it is not necessary to change the light intensity to a lower value than usual, it may be determined that the lighting action is valid based on the concerning light intensity setting, and it is not necessary that the lighting action is stopped or that the light intensity is decreased.

In the above-described embodiments, the necessity to stop the lighting action is determined only when power is supplied from the battery 21, but the present invention is not limited to this example. The lighting action may be stopped according to the startup operation before projection is ready even when power is supplied from an external power source. This makes it possible to reduce unnecessary power consumption. It is also possible to prevent a nearby object left behind from being heated unintentionally.

The requirements for determination of the necessity to stop the lighting action may be changeable by an input operation of the user via the user operation receiver 151.

In the above-described embodiments, the push-button switch that is subject to unintended operations is described as the user operation receiver 151, but the present invention is not limited to this example. For example, the user operation receiver 151 may be a slide switch.

In the above-described embodiments, the projecting apparatus that emits projection light according to image data is described, but the present invention is not limited to this example. For example, the above-described processes of assessment and determination and the control of the lighting actions based on the determination result may be performed on a projecting apparatus that projects images of a film or slide upon receipt of a startup operation.

The configuration, the elements and steps of the control operation, and so forth described in the above-described embodiments and modification examples can be appropriately combined as long as not conflicting each other.

In the above description, the ROM 12 constituted of a readable/writable non-volatile memory such as a flash memory is described as a computer readable medium storing the program(s) 121 for the light emission control process, but the present invention is not limited to these examples. The computer readable mediums may each be another type of nonvolatile memory, such as an MRAM, or a portable recording medium, such as a CD-ROM or a DVD. Furthermore, carrier waves may be used as media to provide, via a communication line, data of the programs disclosed herein in the present disclosure.

Besides, the specific details of the configuration, the elements and steps of the control operation, and so forth of the projecting apparatus 1 or 1a described in the above-described embodiments can be appropriately modified without departing from the scope of the present invention.

One or more embodiments of the present disclosure have been described hereinbefore. However, the scope of the present invention is not limited to the embodiments, and includes the scope of claims below and the scope of their equivalents.

What is claimed is:

1. A projecting apparatus comprising:
   a projector that emits projection light;
   a processor that controls an operation of the projector;
   a user operation receiver that receives an input operation, and
   a measurer that includes an acceleration sensor for measuring an acceleration in three axes of the projecting apparatus including a gravitational acceleration; an object detection sensor for detecting whether a surrounding object exists; and an illuminance sensor for measuring an illuminance of outside the projector;
   wherein in receipt of the input operation concerning startup of the projecting apparatus, the processor assesses a plurality of states of the projecting apparatus and determines whether a lighting action of the projection light from the projector is valid based on an assessment result of the plurality of states of the projecting apparatus,
   wherein the processor assesses one of the states concerning the illuminance based on a measurement of the illuminance sensor and determines that the lighting action is not valid in response to assessment that the illuminance state does not satisfy an illuminance requirement, and
   wherein the processor assesses another one of the states concerning positional relation between the projector and the surrounding object by determining a gravity direction and installation plane of the projector based on the detected gravitational acceleration by the acceleration sensor and determining an existence of the surrounding object by the detection thereof by the object detection sensor, and determines the lighting action is not valid in response to assessment that the positional relation state in directions from the projector besides the gravity direction does not satisfy a positional relation requirement.

2. The projecting apparatus according to claim 1, wherein in response to a determination that the lighting action is not valid based on the assessment result, the processor reduces a light intensity of the projection light from the projector.

3. The projecting apparatus according to claim 2, wherein the processor stops emission of the projection light from the projector when reducing the light intensity of the projection light.

4. The projecting apparatus according to claim 1, further comprising:
   a battery; and
   a power supply circuit that supplies power selectively from an external power source or the battery,
   wherein the processor determines whether the lighting action is valid based on the assessment result when the power is supplied from the battery.

5. The projecting apparatus according to claim 1, wherein the processor assesses another one of the states based on motion according to a measurement of the acceleration sensor and determines whether the lighting action is valid based on the assessment result of the motion state.

6. The projecting apparatus according to claim 1, wherein an object in an emission direction of the projection light is detectable by the object detection sensor, wherein in response to detection of the surrounding object around the emission direction, the processor determines that the lighting action is not valid.

7. The projecting apparatus according to claim 1, wherein the illuminance sensor is arranged so as to be directed in an emission direction of the projection light.

8. The projecting apparatus according to claim 7, wherein the processor acquires an illuminance measurement of the illuminance sensor before start of the lighting action and after emission of the projection light and determines whether the lighting action is valid based on the state concerning a magnitude of illuminance change.

9. The projecting apparatus according to claim 1, wherein the processor acquires an illuminance measurement of the illuminance sensor before start of the lighting action and after emission of the projection light and determines whether the lighting action is valid based on the state concerning a magnitude of illuminance change.

10. The projecting apparatus according to claim 1, further comprising:
    an indicator that performs notification,
    wherein in response to a determination that the lighting action is not valid, the processor causes the indicator to perform the notification according to the determination.

11. The projecting apparatus according to claim 1, wherein the processor acquires an illuminance measurement of the illuminance sensor before start of the lighting action and determines whether the lighting action is valid based on a magnitude of an illuminance of ambient light.

12. The projecting apparatus according to claim 11, wherein the processor determines that the lighting action is not valid in response to assessment that the illuminance measurement of the illuminance sensor before the start of the lighting action is equal to or less than a first threshold.

13. A light emission control method for a projecting apparatus comprising a projector that emits projection light, a processor that controls an operation of the projector, a user operation receiver that receives an input operation, and a measurer including an acceleration sensor, an object detection sensor, and an illuminance sensor, the method comprising:
    measuring, using the acceleration sensor of the measurer, an acceleration in three axes of the projecting apparatus including a gravitational acceleration;
    detecting, using the object detection sensor of the measurer, whether a surrounding object exists;
    measuring, using the illuminance sensor of the measurer, an illuminance of outside the projector;

assessing, in receipt of the input operation concerning startup of the projecting apparatus, a plurality of states of the projecting apparatus;

determining whether a lighting action of the projection light from the projector is valid based on an assessment result of the plurality of states of the projecting apparatus;

assessing one of the states concerning an illuminance based on a measurement of the illuminance sensor and determining that the lighting action is not valid in response to assessment that the state does not satisfy an illuminance requirement, and assessing another one of the states concerning positional relation between the projector and the surrounding object by determining a gravity direction and installation plane of the projector based on the detected gravitational acceleration by the acceleration sensor and determining an existence of the surrounding object by the detection thereof by the object detection sensor, and determining the lighting action is not valid in response to assessment that the positional relation state in directions from the projector besides the gravity direction does not satisfy a positional relation requirement.

14. A non-transitory computer-readable storage medium having a program stored thereon for controlling a computer used in a projecting apparatus comprising a projector that emits projection light, a processor that controls an operation of the projector, a user operation receiver that receives an input operation, and a measurer including an acceleration sensor, an object detection sensor, and an illuminance sensor, the program causing the computer to perform:

measuring, using the acceleration sensor of the measurer, an acceleration in three axes of the projecting apparatus including a gravitational acceleration;

detecting, using the object detection sensor of the measurer, whether a surrounding object exists;

measuring, using the illuminance sensor of the measurer, an illuminance of outside the projector;

assessing, in receipt of the input operation concerning startup of the projecting apparatus, a plurality of states of the projecting apparatus;

determining whether a lighting action of the projection light from the projector is valid based on an assessment result of the plurality of states of the projecting apparatus;

assessing one of the states concerning an illuminance based on a measurement of the illuminance sensor and determining that the lighting action is not valid in response to assessment that the state does not satisfy an illuminance requirement, and assessing another one of the states concerning positional relation between the projector and the surrounding object by determining a gravity direction and installation plane of the projector based on the detected gravitational acceleration by the acceleration sensor and determining an existence of the surrounding object by the detection thereof by the object detection sensor, and determining the lighting action is not valid in response to assessment that the positional relation state in directions from the projector besides the gravity direction does not satisfy a positional relation requirement.

* * * * *